United States Patent Office 2,793,160
Patented May 21, 1957

2,793,160

POLIOMYELITIS VACCINE

I William McLean, Jr., Grosse Pointe, Mich., assignor to Parke, Davis & Company, Detroit, Mich., a corporation of Michigan No Drawing. Application May 9, 1955,
Serial No. 507,163

7 Claims. (Cl. 167—78)

This invention relates to vaccine products and to methods for preparing the same. More particularly, the invention relates to poliomyelitis vaccine products and to methods for preparing the same.

As is known, poliomyelitis is a vrius disease which may be fatal or have far-reaching crippling effects. Because of the nature of the disease, the only sound approach to the problem lies in prophylaxis, that is, in devising means to prevent the occurrence of the disease. Recently, a killed poliomyelitis vaccine composed of killed but antigenic poliomyelitis viruses of types 1, 2 and 3 has been developed and has undergone exhaustive clinical testing. This poliomyelitis vaccine is, like many other vaccines, an aqueous preparation which is administered by injection. Because of this it is essential that the vaccine be sterile, that is, free from contaminating bacteria, molds and fungi not only at the time of manufacture and packaging but also at the time of administration. While it is perhaps at least theoretically possible to prepare and package the vaccine under aseptic conditions, such vaccines at the time of administration may well be contaminated, particularly if the package is what is commonly known in the trade as a multiple dose package. Moreover, manufacturing under completely aseptic conditions is prohibitive from a cost standpoint and completely impractical. In an attempt to insure that the poliomyelitis virus vaccine will be free from contaminating bacteria, molds and fungi and to safely remain so it has been proposed to add a mercurial, specifically thimerosal, as a preservative. While this expedient has provided a solution to the problem of contamination it has given rise to another and perhaps even more serious problem, namely, that the thimerosal causes the poliomyelitis vaccine to lose its potency. Because of this poliomyelitis vaccine products containing thimerosal as a preservative must be administered soon after their manufacture. This is, of course, highly undesirable because the vaccine is difficult and expensive to prepare and under such circumstances production must be limited to anticipated short term requirements. In view of this and because the vaccine requires several months to prepare, it is impractical to produce sufficient vaccine to meet unexpected emergency demands. There is therefore a pressing need for a poliomyelitis vaccine product which will not only be safely free from contaminating bacteria, fungi and molds at the time of administration but which will also retain its potency, that is, its antigenicity, over a considerable period of time under normal conditions of storage.

It is an object of the present invention to provide a poliomyelitis vaccine product which remains safely free from contaminating bacteria, molds and fungi over a considerable period of time under normal conditions of storage and use by physicians.

It is also an object of the invention to provide a poliomyelitis vaccine product which retains its antigenicity over a considerable period of time under normal conditions of storage.

Surprisingly both of these objects as well as other objects which will appear hereinafter can be realized and the aforementioned difficulties with poliomyelitis vaccine products overcome in accordance with the invention, by incorporating into a "killed" poliomyelitis vaccine, i. e., an aqueous solution containing non-infectious but antigenic poliomyelitis virus, a substance belonging to a class of compounds known to be protein precipitants and denaturants. More particularly, the present invention comprises incorporating benzethonium chloride in an aqueous killed poliomyelitis vaccine in a concentration, grams per milliliter, in the range from about 1:20,000 to 1:50,000. The benzethonium chloride is preferably incorporated in the vaccine by slowly adding a dilute aqueous solution of the benzethonium chloride to the aqueous killed poliomyelitis vaccine, with efficient stirring. Chemically benzethonium chloride is known as benzyldimethyl[2-(2-<p-1,1,3,3,-tetramethylbutylphenoxy>ethoxy)-ethyl]ammonium chloride monohydrate and has the formula

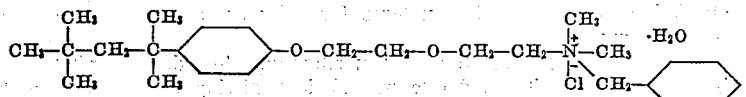

The preferred products are those which contain benzethonium chloride in a concentration in the range from 1:20,000 to 1:40,000.

The aqueous, killed poliomyelitis vaccines used in the production of products of the invention can contain any or all of the various types of poliomyelitis virus. The preferred vaccines are those which contain types 1, 2 and 3 of poliomyelitis virus. Particularly suitable vaccines are those which are relatively low in protein content, preferably those which contain less than about 18 to 20 gamma per ml. of protein nitrogen. Such vaccines can be produced in a number of different ways. For example, macerated monkey kidney tissue can be trypsinized to remove extraneous tissue, the residual cells allowed to multiply, the medium inoculated with the poliomyelitis virus, the mixture incubated, the fluid harvested and the living virus inactivated by treatment with formaldehyde, ultraviolet radiation or other suitable means. If desired, vaccines prepared by omission of the trypsinization step can also be used but in this instance the protein content of the vaccine may be excessively high and should be assayed before use. In the preparation of mixed vaccines, that is, vaccines containing more than one type of poliomyelitis virus, it is customary to pool or mix the harvested fluids containing the various types subsequent to the inactivation step although, if desired, this can be done preliminarily. When using formaldehyde inactivated vaccines, best results in accordance with the invention are obtained by the use of vaccines to which no sodium bisulfite has been added to reduce the formaldehyde content.

The invention is illustrated by the following examples.

EXAMPLE 1

Cells for the cultivation of poliomyelitis virus are prepared by the method of Dulbecco, Journal of Experimental Medicine, 99, page 167 (1954). Briefly, this procedure consists in first preparing a suspension of monkey kidney epithelial cells [see Dulbecco, Proc. Nat. Acad. Sci., 38, page 747 (1952)] by treating macerated kidney tissue from healthy Cynomalgus or Rhesus monkeys with trypsin to remove extraneous matter and release the individual cells. These cells are allowed to multiply on a suitable glass surface in any of a number of tissue culture mediums. The sheet of cultivated kidney cells thus produced is then inoculated with a seed culture of type 1 (Mahoney strain) poliomyelitis virus and the mixture incubated at 36–37° C. until destruction of the cells is complete and large amounts of new virus have been released. The fluid containing the virus is harvested and passed through an ultra-fine fritted glass candle. The filtrate containing the living type 1 poliomyelitis virus is assayed for virus content, bacterial sterility and strain purity.

A filtrate containing living type 2 (MEF–1 strain) poliomyelitis virus is prepared by the method described above for the preparation of the filtrate containing type 1 poliomyelitis virus. A filtrate containing living type 3 (Saukett strain) poliomyelitis virus is also prepared by the same method.

The living viruses contained in the separate filtrates are inactivated by the addition of formaldehyde and incubation of the resulting separate mixtures in accordance with the procedure set forth in detail in amendment 2 to the Minimum Requirements of Poliomyelitis Vaccine published May 20, 1954, by the United States Department of Health, Education, and Welfare. No sodium bisulfite is added to neutralize the excess formaldehyde. Approximately equal quantities of the types 1, 2 and 3 killed poliomyelitis virus vaccines are pooled and the resulting pooled vaccine is divided into aliquots which are used in the preparation of the products of the invention. One aliquot is retained in unaltered form for use as a control sample.

0.75 ml. of a 1% solution of benzethonium chloride is slowly added with moderate but efficient stirring to 150 ml. of cold aqueous killed poliomyelitis vaccine prepared as indicated above. The resulting product is filled into ampoules in convenient amounts for use in immunization. This poliomyelitis vaccine product which contains benzethonium chloride in a concentration of 1:20,000 retains its potency under normal conditions of storage (refrigerator temperature) for at least eight months. It also remains free from contaminating bacteria, molds and fungi under normal conditions of use and storage.

The potency tests on the control sample and the vaccine product of the invention are set forth in Table 1 below. These potencies are determined by the serum neutralization method described by Salk, Youngner and Ward, American Journal of Hygiene, 60, page 214 (1954). The results are expressed in terms of geometric mean titre. Briefly the test method involves inoculating monkeys with three 1 cc. doses of the test vaccine at weekly intervals, bleeding the animals at the end of the treatment period, preparing a serum from the collected blood and determining the number of antibodies present in the serum. This determination is made by serially diluting the serum with saline and mixing the diluted aliquots with a standardized solution containing a known number of infectious units of the given type of poliomyelitis virus. For example, when analyzing for type 1 potency, one uses a standardized solution containing a known number of infectious units of type 1 poliomyelitis virus; for analysis of type 2 or type 3 potency, one uses a standardized solution of infectious type 2 or type 3 virus. The end point of the titration is the dilution at which the serum contains sufficient antibodies to exactly neutralize, that is, combine with and render non-infectious, the known number of infectious units of the virus in the standardized solution. A number of monkeys are used in the analysis of the potency for each type of poliomyelitis virus. The results so obtained are placed in a form for convenient comparison and statistical evaluation by taking the log to the base 2 of the end point dilution for the serum for each monkey, averaging these figures and then taking the antilog of the average so obtained. This antilog is called the geometric mean titre of the vaccines and it, of course, is different for each type of virus present in the vaccine. Since the geometric mean titre is dependent upon the potency of the standardized solution of the infectious poliomyelitis virus used in the test it is necessary to specify the number of infectious units of the poliomyelitis virus present in the standardized solution to reflect the proper significance of the geometric mean titre. The method of calculating the geometric mean titre is set forth in detail in amendment Number 2 to the Minimum Requirements of Poliomyelitis Vaccine referred to hereinbefore.

To determine the stability of the antigenic properties of the vaccine product of the invention on storage, the vaccine product was heated at 37° C. for one week and then stored at 4° C. for eight weeks. The potency of each type of virus was then determined as described above. Since one week of heating at 37° C. produces the same effect upon the potency of a vaccine as storage for six months at 4° C., the vaccine product under test was stored the equivalent of eight months at 4° C. The control sample was stored at 4° C. for nine weeks and then the potency of each strain of the virus was determined as described above.

*Table 1*

| Sample Tested | Virus Type | Number of Monkeys Used | No. of Infectious Units of Virus Neutralized [1] | Geometric Mean Titre |
|---|---|---|---|---|
| Control | 1 | 8 | $10^{1.6}$ | 256 |
| | 2 | 8 | $10^{1.5}$ | 650 |
| | 3 | 8 | $10^{2.8}$ | 41 |
| Vaccine product containing benzethonium chloride (c=1:20,000). | 1 | 12 | $10^{1.6}$ | 204 |
| | 2 | 12 | $10^{1.5}$ | 540 |
| | 3 | 12 | $10^{2.8}$ | 47 |

[1] Potency of standardized solution used in tests.

As will be apparent from the above results the vaccine product of the invention retained its potency with respect to all three types of virus over the equivalent of storage at 4° C. for eight months. In contrast to this, vaccines to which thimerosal has been added as a preservative completely lose their potency with respect to all three types of the virus under the same conditions of storage. This is shown by the following tests.

A formaldehyde inactivated vaccine containing types 1, 2 and 3 of poliomyelitis virus is prepared as described above and divided into aliquots. One aliquot is retained as a control and sufficient thimerosal is added to another aliquot to bring the thimerosal concentration to 1:100,000. The control sample and the sample containing the thimerosal are heated at 37° C. for one week, stored at 4° C. for one week, and then the potency of each type of virus is determined by the method described above. The heating and storage of these samples was equivalent to storage at 4° for about six months. The results of the potency tests are set forth in Table 2.

*Table 2*

| Sample Tested | Virus Type | Number of Monkeys Used | No. of Infectious Units of Virus Neutralized [1] | Geometric Mean Titre |
|---|---|---|---|---|
| Control | 1 | 11 | $10^{1.5}$ | 284 |
| | 2 | 11 | $10^{1.5}$ | 809 |
| | 3 | 11 | $10^{0.8}$ | 773 |
| Vaccine product containing thimerosal (c=1:100,000). | 1 | 12 | $10^{1.5}$ | $<4$ |
| | 2 | 12 | $10^{1.5}$ | 23 |
| | 3 | 12 | $10^{0.8}$ | 9 |

[1] Potency of standardized solution used in tests.

EXAMPLE 2

A formaldehyde inactivated vaccine containing types 1, 2 and 3 of poliomyelitis virus is prepared as described in Example 1 and divided into aliquots. One aliquot is retained in unaltered form for use as a control sample.

Another aliquot of the vaccine is converted to a vaccine product of the invention by adding dropwise over a period of approximately two minutes 5 ml. of a 1:200 solution of benzethonium chloride with efficient stirring in the cold, to each liter of the vaccine. The resulting solution containing benzethonium chloride in a concentration of 1:40,000 constitutes the vaccine product of the invention.

To determine the stability of the antigenic properties of the vaccine product of the invention on storage, the vaccine product was stored at 4° C. for four weeks. The potency of each type of virus was then determined as described above. The control sample was stored concurrently at 4° C. for four weeks and then the potency of each type of virus was determined as described above. The results of these potency tests are set forth in Table 3.

Table 3

| Sample Tested | Virus Type | Number of Monkeys Used | No. of Infectious Units of Virus Neutralized [1] | Geometric Mean Titre |
|---|---|---|---|---|
| Control | 1 | 12 | $10^{1.36}$ | 178 |
|  | 2 | 12 | $10^{1.5}$ | 316 |
|  | 3 | 12 | $10^{1.86}$ | 107 |
| Vaccine product containing benzethonium chloride (c=1:40,000) | 1 | 10 | $10^{1.36}$ | 152 |
|  | 2 | 10 | $10^{1.5}$ | 490 |
|  | 3 | 10 | $10^{1.86}$ | 60 |

[1] Potency of standardized solution used in tests.

For the purpose of comparison, the results of potency tests of another control sample and vaccine product of the invention, prepared in accordance with the procedure described above from a different formaldehyde inactivated vaccine containing types 1, 2 and 3 of poliomyelitis virus, are set forth below in Table 4.

Table 4

| Sample Tested | Virus Type | Number of Monkeys Used | No. of Infectious Units of Virus Neutralized [1] | Geometric Mean Titre |
|---|---|---|---|---|
| Control | 1 | 11 | $10^{1.36}$ | 68 |
|  | 2 | 11 | $10^{1.5}$ | 141 |
|  | 3 | 11 | $10^{1.86}$ | 76 |
| Vaccine product containing benzethonium chloride (c=1:40,000) | 1 | 12 | $10^{1.36}$ | 71 |
|  | 2 | 12 | $10^{1.5}$ | 71 |
|  | 3 | 12 | $10^{1.86}$ | 76 |

[1] Potency of standardized solution used in tests.

As will be apparent from the results of Tables 3 and 4 the vaccine products of the invention containing benzethonium chloride in a concentration of 1:40,000 retained their potency with respect to all three types of virus on storage at 4° C. for four weeks. The control samples retained their potency under the same conditions of storage but were susceptible to contamination from molds and fungi. As is also evident, there was no significant difference between the potency of the vaccine products containing benzethonium chloride and the potency of the control samples.

This application is a continuation-in-part of my co-pending application, Serial No. 498,107, filed March 30, 1955, now abandoned.

I claim:

1. A poliomyelitis vaccine product comprising an aqueous solution containing at least one type of killed but antigenic poliomyelities virus and benzethonium chloride in a concentration in the range from 1:20,000 and 1:50,000.

2. A poliomyelitis vaccine product comprising an aqueous solution of killed but antigenic types 1, 2 and 3 of poliomyelitis virus and benzethonium chloride in a concentration in the range from 1:20,000 and 1:50,000.

3. A poliomyelitis vaccine product comprising an aqueous solution of killed but antigenic types 1, 2 and 3 of poliomyelitis virus containing less than 18 to 20 gamma per milliliter of protein nitrogen and benzethonium chloride in a concentration in the range from 1:20,000 and 1:50,000.

4. A poliomyelitis vaccine product comprising an aqueous solution of killed but antigenic types 1, 2 and 3 of poliomyelitis virus containing less than 18 to 20 gamma per milliliter of protein nitrogen and benzethonium chloride in a concentration of 1:20,000.

5. A poliomyelitis vaccine product comprising an aqueous solution of killed but antigenic types 1, 2 and 3 of poliomyelitis virus containing less than 18 to 20 gamma per milliliter of protein nitrogen and benzethonium chloride in a concentration of 1:40,000.

6. A poliomyelitis vaccine product comprising an aqueous solution containing at least one type of killed but antigenic poliomyelitis virus containing less than 18 to 20 gamma per milliliter of protein nitrogen and benzethonium chloride in a concentration in the range from 1:20,000 and 1:50,000.

7. A poliomyelitis vaccine product comprising an aqueous solution containing at least one type of killed poliomyelitis virus and benzethonium chloride in a concentration in the range from 1:20,000 to 1:50,000, said killed virus being present in a concentration sufficient for the production of antibodies upon administration of the vaccine product.

References Cited in the file of this patent

Michaels: Mfg. Chemist, October 1949, vol. 20, No. 10, pp. 487–489.

Lawrence: "Surface Active Quaternary Ammonium Germicides," publ. 1950 by Academic Press Inc., New York, N. Y., pp. 108–111.